United States Patent
Vail et al.

(10) Patent No.: US 6,918,068 B2
(45) Date of Patent: Jul. 12, 2005

(54) FAULT-TOLERANT COMMUNICATIONS SYSTEM AND ASSOCIATED METHODS

(75) Inventors: David Kenyon Vail, West Melbourne, FL (US); Stephen S. Wilson, Melbourne, FL (US); Jeffrey D. Volz, Malabar, FL (US); Joshua P. Bruckmeyer, Melbourne, FL (US); Allen G. Plum, Rockledge, FL (US)

(73) Assignee: Harris Corporation, Melbourne, FL (US)

( * ) Notice: Subject to any disclaimer, the term of this patent is extended or adjusted under 35 U.S.C. 154(b) by 642 days.

(21) Appl. No.: 10/118,271

(22) Filed: Apr. 8, 2002

(65) Prior Publication Data

US 2003/0192000 A1 Oct. 9, 2003

(51) Int. Cl.[7] .............................................. G06F 11/00
(52) U.S. Cl. ........................................ 714/56; 710/38
(58) Field of Search .................... 714/43, 56; 710/316, 710/38; 398/145, 57; 209/239; 379/16, 272–273; 370/351–430; 340/508, 2.23–2.24

(56) References Cited

U.S. PATENT DOCUMENTS

| | | | |
|---|---|---|---|
| 4,630,265 A | | 12/1986 | Sexton .......................... 370/85 |
| 4,668,465 A | * | 5/1987 | Boomgaard et al. ......... 376/216 |
| 4,837,788 A | | 6/1989 | Bird .............................. 375/3 |
| 5,155,735 A | * | 10/1992 | Nash et al. .................. 714/800 |
| 5,276,678 A | * | 1/1994 | Hendrickson et al. ...... 370/267 |
| 5,471,597 A | * | 11/1995 | Byers et al. ................ 711/215 |
| 5,555,372 A | | 9/1996 | Tetreault et al. ....... 395/182.13 |
| 5,666,480 A | | 9/1997 | Leung et al. ................ 395/180 |
| 6,052,752 A | | 4/2000 | Kwon ........................ 710/126 |

OTHER PUBLICATIONS

Specification for One Channel of the STC Logic, Nov. 10, 2000.*
Specifications for the STC Control Logic, Nov. 10, 2000.*

* cited by examiner

*Primary Examiner*—Paul R. Myers
(74) *Attorney, Agent, or Firm*—Allen, Dyer, Doppelt, Milbrath & Gilchrist, P.A.

(57) ABSTRACT

A communications system may include a plurality of communications buses, at least one bus device connected to the plurality of communications buses, and a plurality of bus controllers for sending a plurality of bus enable signals to the at least one bus device. The at least one bus device may include selection circuitry for selecting one of the communications buses based upon the plurality of bus enable signals while being tolerant of an error on at least one of the bus enable signals. First and second bus enable signals may have a same value and may be generated by a primary bus controller upon receiving power. A third bus enable signal may be generated by a redundant bus controller upon receiving power.

30 Claims, 5 Drawing Sheets

FAULT-TOLERANT COMMUNICATIONS SYSTEM AND ASSOCIATED METHODS

FIELD OF THE INVENTION

The present invention relates to the field of fault-tolerant communications systems, and more particularly, to selecting between multiple buses in a fault-tolerant communications system.

BACKGROUND OF THE INVENTION

A typical communications system may include multiple devices, which communicate over a communications bus. The bus may be a serial bus, which sends information sequentially, or may be a parallel bus, which sends information over parallel paths, such as may be found in a computer, for example. Unfortunately, if the communications bus fails or is disrupted, the device may fail entirely. Accordingly, systems requiring higher reliability may typically include a plurality of communications buses, so that if one fails, another one may be used. More particularly, the devices connected to the buses may select or be commanded to operate using one bus among the plurality of buses.

One approach to control switching of devices to use a desired bus includes a bus controller to provide a single bus enable signal to the various other devices, typically slave devices. This single bus enable signal is typically implemented via a resistor connected to power, which is delivered to the bus controller. Accordingly, when the bus controller is selectively powered, the bus enable signal is also generated so that a selected bus, that is, the primary bus, is used by the slave devices. Conversely, if the bus enable signal is not present, or at logic "0", for example, the slave devices switch from the primary bus to a redundant bus. Unfortunately, a shortcoming of such an approach is that some types of faults in the bus enable signal may also cause complete system failure. For example, a bus enable signal might fail as an open circuit or become connected to some other logic signal in the system (i.e., a bridge fault). The signal might also fail in a way that results in increased susceptibility to electrical noise. These types of bus enable faults can cause complete system failure since these failure types can interfere with commanded switch-overs to a redundant bus.

Another approach to selecting between multiple buses, may be considered an autonomous approach. In accordance with this approach, the bus device monitors activity on the buses and uses a selection algorithm to decide which bus to use. Such an approach is further disclosed in U.S. Pat. No. 4,630,265 to Sexton, for example. This approach may also suffer from errors thereby causing failure of the entire system. Along these lines, U.S. Pat. No. 4,837,788 to Bird discloses a repeater for extending local area networks wherein the repeater also makes a bus selection determination based upon signals on the buses.

U.S. Pat. No. 5,555,372 to Tetreault et al. discloses a relatively complicated system including a device which monitors for errors on multiple buses and broadcasts an error signal if the currently selected bus experiences an error. To avoid inconsistent phasing operation when a number of such devices are in use, the device will retransmit a broadcast error signal regardless of the device's current bus selection state.

Unfortunately, the prior art approaches to providing switching of bus devices between multiple buses may suffer from other relatively likely errors, which result in system disruption or failure. For example, those approaches using a single bus enable signal from a bus controller may fail if there is a single error in the bus enable signal (as described above). An autonomous selection system may also suffer from single errors, if the bus selection is inconsistent for some devices using the bus.

SUMMARY OF THE INVENTION

In view of the foregoing background, it is therefore an object of the present invention to provide a communications system and associated method, which is more tolerant of possible errors without suffering failure.

This and other objects, features and advantages in accordance with the present invention are provided by a communications system preferably comprising a plurality of communications buses, at least one bus device connected to the plurality of communications buses, and a plurality of bus controllers for sending a plurality of bus enable signals to the bus device. More particularly, the bus device may include selection circuitry for selecting one of the communications buses based upon the plurality of bus enable signals and while being tolerant of an error on at least one of the bus enable signals. Accordingly, an error in the bus enable signals will not cause system failure.

The bus controllers may include a primary bus controller that generates first and second bus enable signals. In addition, the primary bus controller may generate first and second bus enable signals both having a same value based upon receiving a primary bus select signal. The primary bus select signal may be delivery of power to the primary bus controller.

The bus controllers may also include a redundant bus controller that generates a third bus enable signal. The redundant bus controller may generate the third bus enable signal based upon receiving a redundant bus select signal. Also, the redundant bus select signal may be delivery of power to the redundant bus controller. In other words, a very straightforward and robust, redundant signaling approach may be provided.

The bus device may comprise selection circuitry, which may include a multiplexer or microprocessor, for example. A truth table may be used to determine which communications bus should be selected based upon the bus enable signals received by the bus device.

A method aspect of the invention is for operating the communications system. In particular, the method may include sending a plurality of bus enable signals from at least one bus controller to at least one bus device. The at least one bus device may select one of the communications buses based upon the plurality of bus enable signals while being tolerant of an error on at least one of the bus enable signals.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notations are used to indicate similar elements in alternate embodiments.

Figure 1:
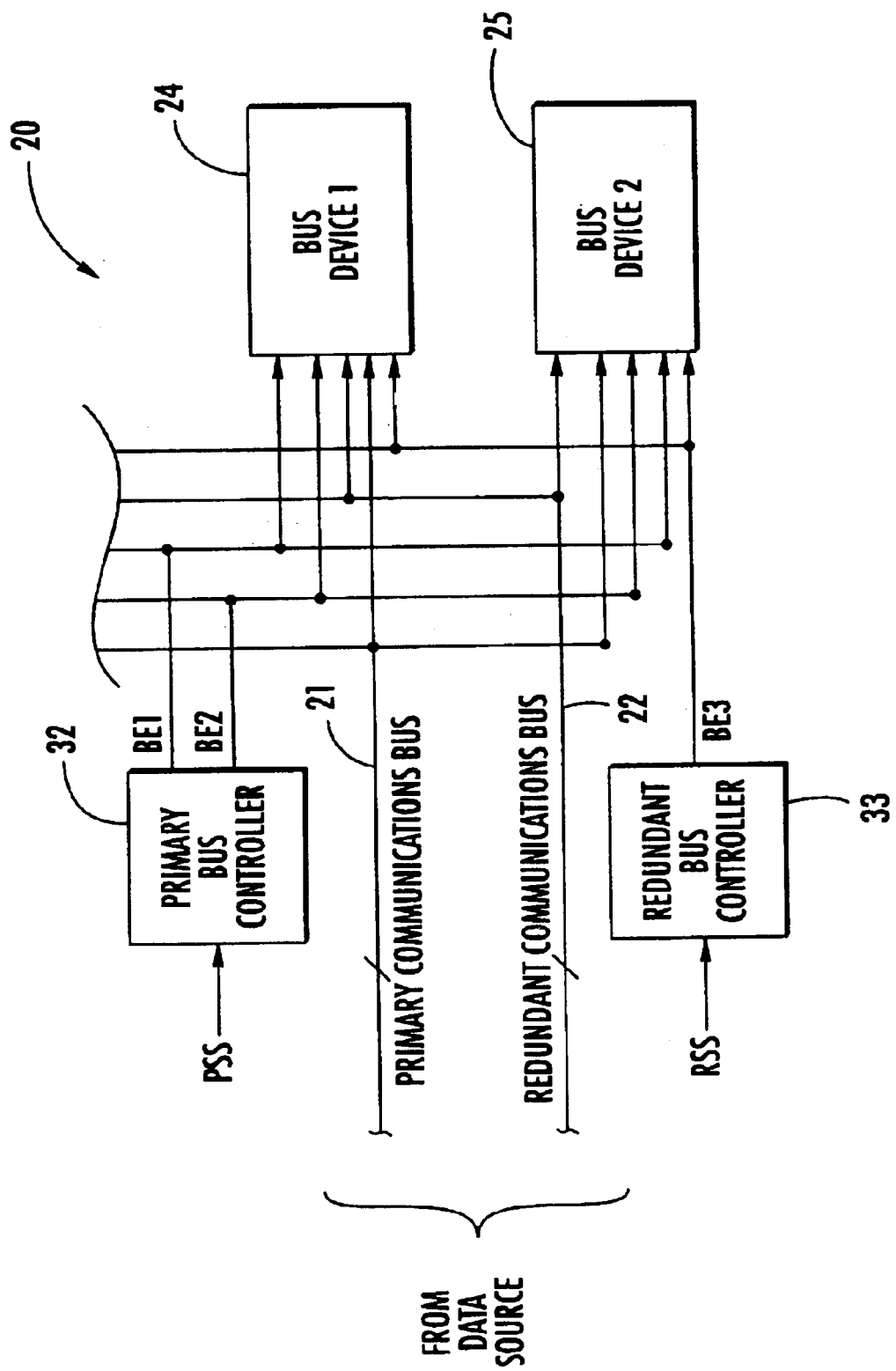
FIG. 1 is schematic block diagram of an embodiment of the communications system in accordance with the present invention.

Referring initially to FIG. 1, a fault-tolerant communications system 20 in accordance with the present invention is now described. The communications system 20 preferably includes a plurality of communications buses 21, 22, one or more bus devices 24, 25 (e.g., bus slave devices) connected to the plurality of communications buses, and a plurality of bus controllers 32, 33 for sending a plurality of bus enable signals BE1–BE3 to the bus devices. More particularly, the bus devices 24, 25 may include selection circuitry for selecting one of the communications buses 21, 22 based upon the plurality of bus enable signals BE1–BE3 and while being tolerant of an error on at least one of the bus enable signals, as will be described further below. Those of skill in the art will recognize that more than one redundant communications bus, redundant data preprocessor, and redundant bus controller may be included in other embodiments.

Figure 8:
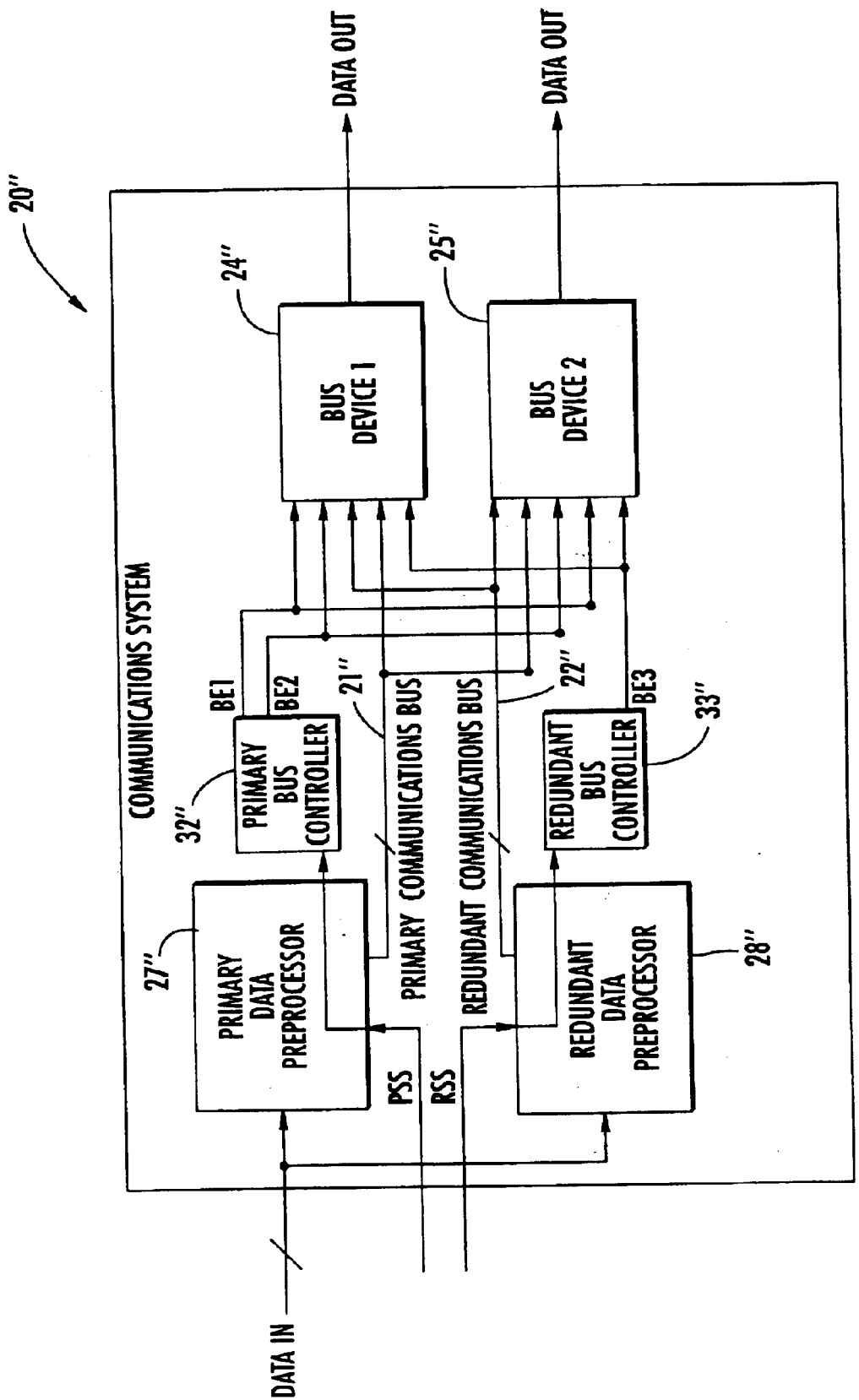
FIG. 8 is a schematic block diagram of an alternate embodiment of the communications system of FIG. 1.

Referring more particularly to FIG. 8, an alternate embodiment of the communications system 20" illustratively includes a plurality of communications buses 21", 22" connecting a plurality of bus devices 24", 25" to a plurality of data preprocessors 27", 28". The plurality of data preprocessors illustratively includes a primary data preprocessor 27" and a redundant data preprocessor 28". In contrast to the communications system 20 illustrated in FIG. 1, it may be seen that the communications system 20" both receives data from and provides data to external sources. It will be appreciated by those of skill in the art that both internal and external data sources may be connected to the communications busses 21, 22, in accordance with the present invention.

Each data preprocessor 27", 28" is connected to a respective bus controller 32, 33 that may be external circuitry from the data preprocessors. Alternately, the bus controllers 32", 33" may be included within the circuitry of the respective data preprocessors 27", 28". The data preprocessors 27", 28" receive respective primary and redundant bus select signals PSS, RSS from other circuitry, not shown. Additionally, the data preprocessors 27", 28" may receive input data from other circuitry as will be appreciated by those skilled in the art. The bus controllers 32", 33" send a plurality of bus enable signals to the bus devices. The bus devices 24", 25" select a communications bus 21", 22" based upon the bus enable signals BE1–BE3 and generate output data based upon the selected communications bus.

More particularly, as illustratively shown, the primary bus controller 32" generates first and second bus enable signals BE1, BE2. The redundant bus controller generates a third bus enable signal BE3. The bus controllers 32", 33" generate the bus enable signals BE1–BE3 based upon receiving respective bus select signals PSS, RSS from external control circuitry. The primary and redundant select signals PSS, RSS may be provided in the form of power delivery to the primary data preprocessor 27", and therefore to the primary bus controller 32"; or to the redundant data preprocessor 28", and thus to the redundant bus controller 33. In other words, a very straightforward and robust, redundant signaling approach may be provided, as will be readily appreciated by those skilled in the art.

Figure 2:
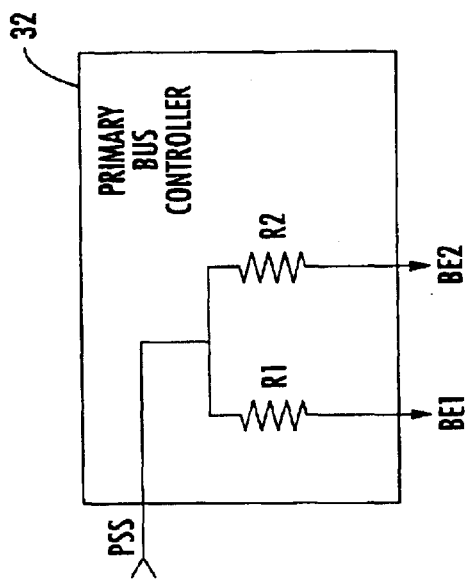
FIG. 2 is a more detailed schematic diagram of the primary bus controller used in the communications system of FIG. 1.
Figure 3:
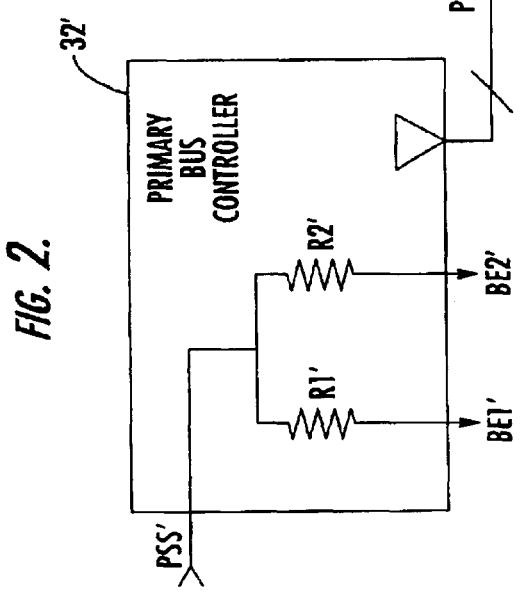
FIG. 3 is an alternate embodiment of the primary bus controller, in accordance with the present invention.

Referring now additionally to FIGS. 2 and 3, the features of the primary bus controller 32 are now described for the illustrated embodiment wherein the primary bus controller is external from the primary data preprocessor 27. The primary bus controller 32 receives power and connects a voltage, such as 3.3 V, to the resistors R1, R2 and generates first and second bus enable signals BE1, BE2 both having a same value. This is based upon receiving a primary bus select signal PSS from the primary data preprocessor 27 in the form of delivered power. Alternately, as shown in FIG. 3, the primary bus controller 32' may include bus drive circuitry 35' and directly receive the primary bus select signal PSS', as will be appreciated by those skilled in the art.

Figure 4:
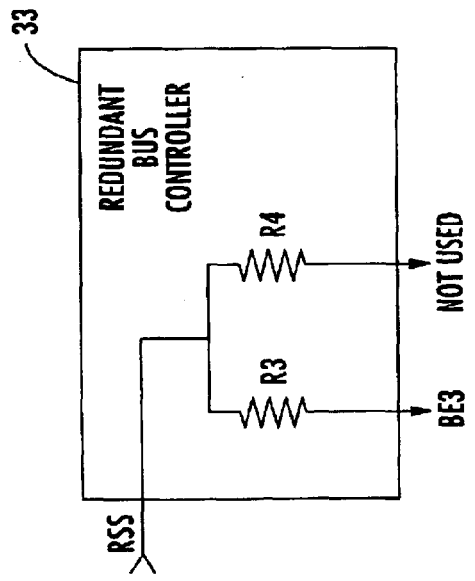
FIG. 4 is a more detailed schematic diagram of the redundant bus controller used in the communications system of FIG. 1.
Figure 5:
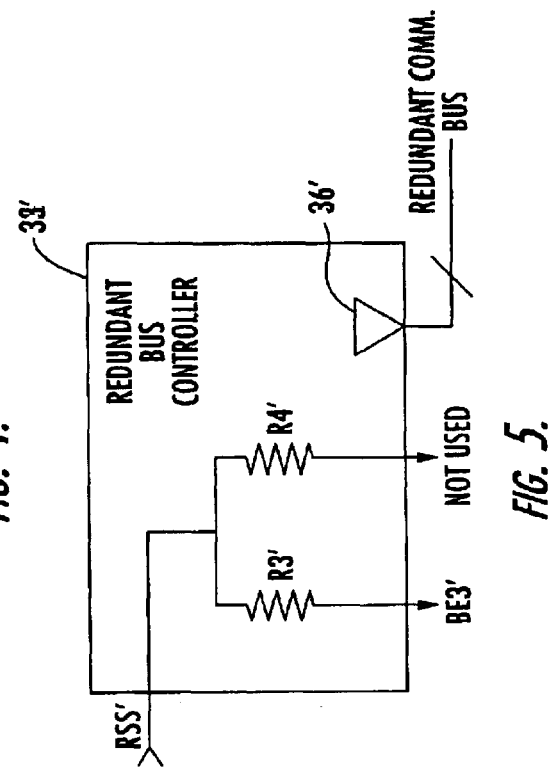
FIG. 5 is an alternate embodiment of the redundant bus controller, in accordance with the present invention.

Referring now additionally to FIGS. 4 and 5, the redundant bus controller 33 is now described. The redundant bus controller 33 supplies a voltage, such as 3.3 V, to the resistors R3, R4 and generates the third bus enable signal based upon receiving a redundant bus select signal RSS from the redundant data preprocessor 28. The third bus enable signal BE3 is communicated to each bus device 24, 25. As illustratively shown, one resistor R4 is not used (this assumes identical assemblies). Alternately, as shown in FIG. 5, the redundant bus controller 33' may include bus driver (and/or receiver) circuitry 36' as will be appreciated by those skilled in the art.

Figure 6:
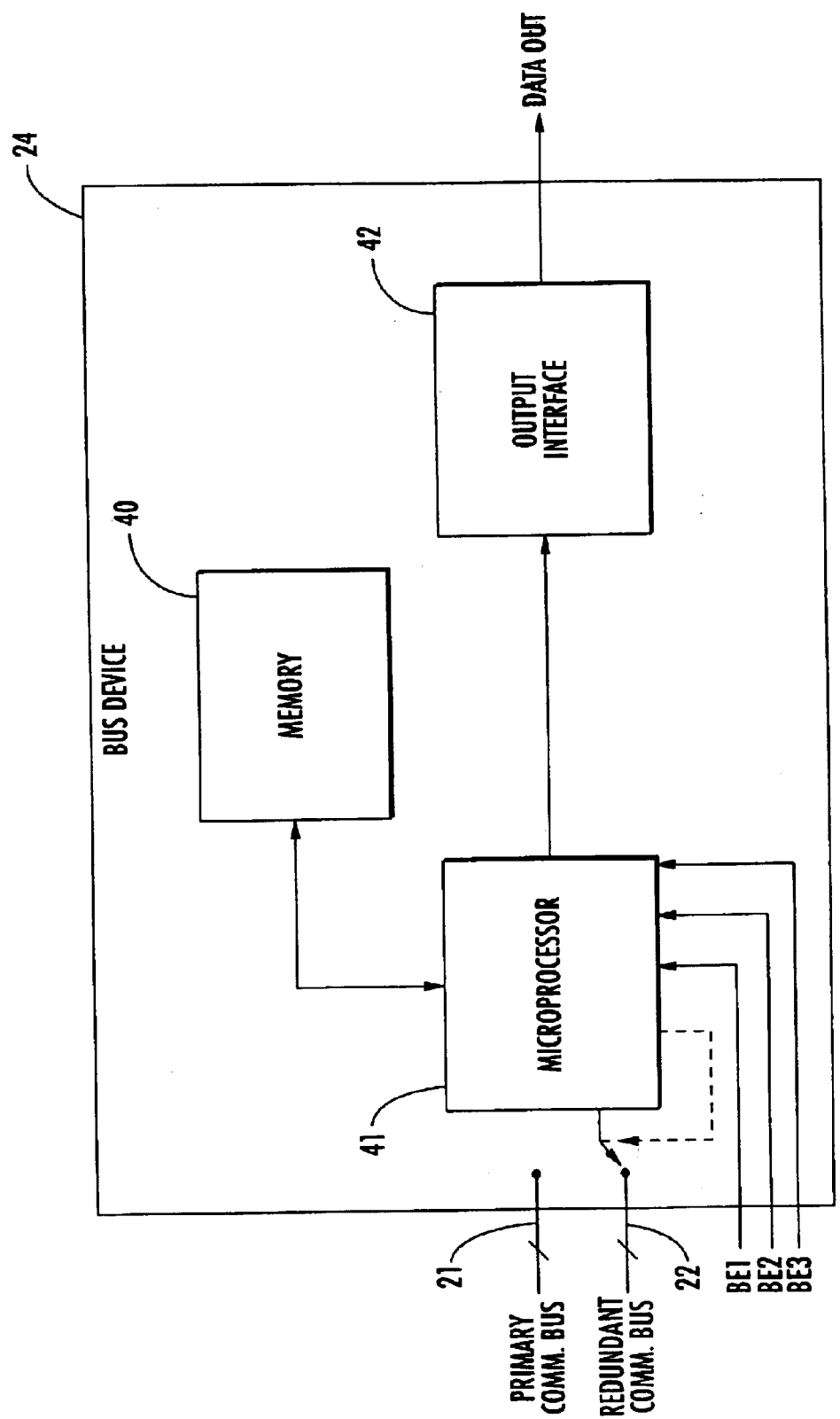
FIG. 6 is a more detailed schematic diagram of the bus device used in the communication system of FIG. 1.

Referring now additionally to FIG. 6, the bus device 24 includes selection circuitry for selecting one of the communications buses 21, 22 based upon the plurality of bus enable signals BE1–BE3 and while being tolerant of an error on at least one of the bus enable signals. Accordingly, an error on one of the bus enable signals BE1–BE3 will not cause system failure. As illustratively shown, the bus device 24 includes a memory 40, a microprocessor 41, and an output interface 42, wherein the microprocessor is connected to the memory and output interface. The microprocessor 41 receives the bus enable signals BE1–BE3, which are processed based upon a truth table to determine which communications bus should be selected.

For example, the following truth table may be used to determine which communications bus 21, 22 should be selected, as will be readily appreciated by those skilled in the art.

| BE3 | BE2 | BE1 | Select | Comments |
| --- | --- | --- | --- | --- |
| 0 | 0 | 0 | R | Bad BE3 |
| 0 | 0 | 1 | P | Bad BE2 |
| 0 | 1 | 0 | P | Bad BE1 |
| 0 | 1 | 1 | P | Normal case: P Selected, BE1-3 are all working |
| 1 | 0 | 0 | R | Normal case: |

-continued

| BE3 | BE2 | BE1 | Select | Comments |
|---|---|---|---|---|
|  |  |  |  | R Selected, BE1-3 are all working |
| 1 | 0 | 1 | R | Bad BE1 |
| 1 | 1 | 0 | R | Bad BE2 |
| 1 | 1 | 1 | P | Bad BE3 |

In the above table, BE1= bus enable signal 1; BE2= bus enable signal 2; BE3= bus enable signal 3; R= redundant communications bus; P= primary communications bus; BE1 and BE2 are from primary controller 32; and BE3 is from the redundant bus controller 33. The communications system 20 in this example is able to tolerate fault in the bus enable signals BE1–BE3 while selecting a communications bus 21, 22. Those of skill in the art will recognize that multiple faults may be tolerated in some embodiments, and that other logic circuitry may be used to carry out the functions of the truth table.

Figure 7:
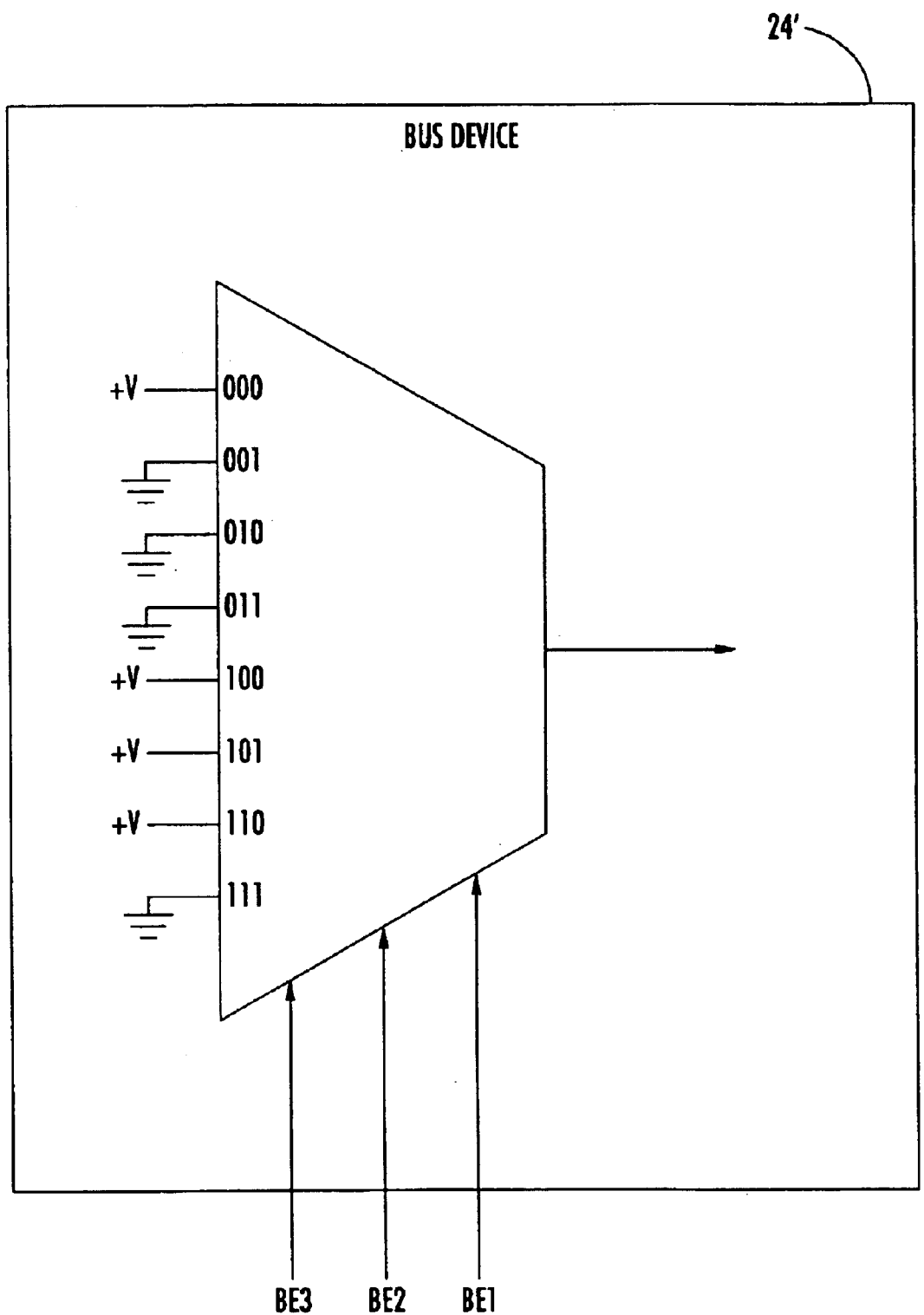
FIG. 7 is an alternate embodiment of the bus device, in accordance with the present invention.

Referring now to FIG. 7, another embodiment of the bus device 24' is now described. Here, a logic 1 corresponds to a primary selection and a logic 0 corresponds to a redundant selection. For example, the bus device 24' may include a simple 8-input multiplexer 37' that can be used to implement the control logic (and truth table) as described above. The multiplexer 37' receives the bus enable signals BE1–BE3 and then selects a communications bus based upon the values of the bus enable signals. For example, assuming BE3 is the most significant bit and BE1 is the least significant bit a value of "000" corresponds to +V (logic 1), which causes the multiplexer to select the redundant communications bus. Alternately, a value of "001" (i.e., BE1=1) produces a ground (Gnd or logic 0), which causes the multiplexer 37' to select the primary communications bus.

A method aspect of the invention is for operating the communications system 20. In particular, the method may include sending a plurality of bus enable signals BE1–BE3 from at least one bus controller 32, 33 to at least one bus device 24, 25. The at least one bus device 24, 25 may select one of the communications buses 21, 22 based upon the plurality of bus enable signals while being tolerant of an error on at least one of the bus enable signals.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A communications system comprising:
a plurality of communications buses;
at least one bus device connected to said plurality of communications buses; and
a plurality of bus controllers for sending a plurality of bus enable signals to said at least one bus device;
said at least one bus device comprising selection circuitry for selecting one of said communications buses based upon the plurality of bus enable signals and while being tolerant of an error on at least one of the bus enable signals.

2. A communications system according to claim 1 wherein said bus controllers comprise a primary bus controller generating first and second bus enable signals.

3. A communications system according to claim 2 wherein said primary bus controller generates first and second bus enable signals both having a same value based upon receiving a primary bus select signal.

4. A communications system according to claim 3 wherein the primary bus select signal comprises power delivery to said primary bus controller.

5. A communications system according to claim 1 wherein said bus controllers comprise a redundant bus controller that generates a third bus enable signal.

6. A communications system according to claim 5 wherein said redundant bus controller generates the third bus enable signal based upon receiving a redundant bus select signal.

7. A communications system according to claim 6 wherein the redundant bus select signal comprises power delivery to said redundant bus controller.

8. A communications system according to claim 1 wherein said selection circuitry comprises a multiplexer.

9. A communications system according to claim 1 further comprising a plurality of data preprocessors connected to said communications buses and to said bus controllers.

10. A communications system according to claim 1 wherein said at least one bus device comprises a plurality of data processing devices.

11. A communications system comprising:
a plurality of communications buses;
a plurality of bus devices connected to said plurality of communications buses; and
a plurality of bus controllers for sending a plurality of bus enable signals to each of said bus devices based upon selective application of power to one of said bus controllers;
each bus device comprising selection circuitry for selecting one of said communications buses based upon the plurality of bus enable signals and while being tolerant of an error on at least one of the bus enable signals.

12. A communications system according to claim 11 wherein said bus controllers comprise a primary bus controller generating first and second bus enable signals.

13. A communications system according to claim 11 wherein said bus controllers comprise a redundant bus controller that generates a third bus enable signal.

14. A communications system according to claim 11 wherein said selection circuitry comprises a multiplexer.

15. A communications system according to claim 11 further comprising a plurality of data preprocessors connected to said communications buses and to said bus controllers.

16. A communications system according to claim 11 wherein said bus devices comprise a plurality of data processing devices.

17. A communications system comprising:
a plurality of communications buses;
at least one bus device connected to said plurality of communications buses; and
at least one bus controller for sending a plurality of bus enable signals to said at least one bus device;
said at least one bus device comprising selection circuitry for selecting one of said communications buses based upon the plurality of bus enable signals and while being tolerant of an error on at least one of the bus enable signals.

18. A communications system according to claim 17 wherein said at least one bus controller comprises a primary bus controller generating first and second bus enable signals.

19. A communications system according to claim 18 wherein said primary bus controller generates first and second bus enable signals both having a same value based upon receiving a primary bus select signal.

20. A communications system according to claim 19 wherein the primary bus select signal comprises power delivery to said primary bus controller.

21. A communications system according to claim 17 wherein said at least one bus controller comprises a redundant bus controller that generates a third bus enable signal.

22. A communications system according to claim 21 wherein said redundant bus controller generates the third bus enable signal based upon receiving a redundant bus select signal.

23. A communications system according to claim 22 wherein the redundant bus select signal comprises power delivery to the redundant bus controller.

24. A communications system according to claim 17 wherein said selection circuitry comprises a multiplexer.

25. A method for operating a communications system comprising a plurality of communications buses, at least one bus device connected to the communications buses, and at least one bus controller also connected to the communications buses, the method comprising:

sending a plurality of bus enable signals from the at least one bus controller to the at least one bus device; and at the at least one bus device, selecting one of the communications buses based upon the plurality of bus enable signals and while being tolerant of an error on at least one of the bus enable signals.

26. A method according to claim 25 wherein sending the bus enable signals comprises:

sending first and second bus enable signals from a primary bus controller; and sending a third bus enable signal from a redundant bus controller.

27. A method according to claim 26 wherein the primary bus controller generates first and second bus enable signals both having a same value based upon receiving a primary bus select signal.

28. A method according to claim 27 wherein the primary bus select signal comprises power delivery to the primary bus controller.

29. A method according to claim 26 wherein the redundant bus controller generates the third bus enable signal based upon receiving a redundant bus select signal.

30. A method according to claim 29 wherein the redundant bus select signal comprises power delivery to the redundant bus controller.

* * * * *